United States Patent
Gao et al.

(10) Patent No.: US 7,275,029 B1
(45) Date of Patent: Sep. 25, 2007

(54) SYSTEM AND METHOD FOR JOINT OPTIMIZATION OF LANGUAGE MODEL PERFORMANCE AND SIZE

(75) Inventors: Jianfeng Gao, Beijing (CN); Kai-Fu Lee, Woodinville, WA (US); Mingjing Li, Beijing (CN); Hai-Feng Wang, Hong Kong (CN); Dong-Feng Cai, Liaoning Province (CN); Lee-Feng Chien, Beijing (CN)

(73) Assignee: Microsoft Corporation, Redmond, WA (US)

( * ) Notice: Subject to any disclaimer, the term of this patent is extended or adjusted under 35 U.S.C. 154(b) by 818 days.

(21) Appl. No.: 09/607,786

(22) Filed: Jun. 30, 2000

Related U.S. Application Data

(60) Provisional application No. 60/163,851, filed on Nov. 5, 1999.

(51) Int. Cl.
*G06F 17/27* (2006.01)
(52) U.S. Cl. .................. 704/9; 704/1; 704/10
(58) Field of Classification Search .............. 704/1, 704/4, 9, 257, 251, 10; 707/2, 3, 4
See application file for complete search history.

(56) References Cited

U.S. PATENT DOCUMENTS

| | | | | |
|---|---|---|---|---|
| 5,195,167 A | * | 3/1993 | Bahl et al. ............... | 704/200 |
| 5,613,036 A | * | 3/1997 | Strong .................... | 704/243 |
| 5,835,893 A | * | 11/1998 | Ushioda ................... | 704/257 |
| 5,905,773 A | * | 5/1999 | Wong ...................... | 379/88.03 |
| 6,044,337 A | * | 3/2000 | Gorin et al. .............. | 704/1 |
| 6,167,398 A | * | 12/2000 | Wyard et al. .............. | 707/5 |
| 6,182,026 B1 | * | 1/2001 | Tillmann et al. ........... | 704/2 |
| 6,188,976 B1 | * | 2/2001 | Ramaswamy et al. ......... | 704/9 |
| 6,317,707 B1 | * | 11/2001 | Bangalore et al. ........... | 704/9 |
| 6,418,431 B1 | * | 7/2002 | Mahajan et al. ............ | 707/4 |
| 6,484,136 B1 | * | 11/2002 | Kanevsky et al. ........... | 704/9 |

OTHER PUBLICATIONS

Law et al., N-th Order Ergodic Multigram HMM for Modeling of Languages without Marked Word Boundaries, 1996, Association for Computational Linguists, pp. 204-209.*
Yang, Kae-Cherng et al., "Statistics Based Segment Pattern Lexicon—A New Direction For Chinese Language Modeling", ICASSP-98—Proceedings of the 1998 IEEE International Conference on Acoustics, Speech and Signal Processing, May 12-15, 1998, pp. 169-172, XP000854542.
Hwang, Kyuwoong, "Vocabulary Optimization Based on Perplexity", ICASSP-97—1997 IEEE International Conference on Acoustics, Speech, and Signal Processing, Apr. 21-24, 1997, pp. 1419-1422, XP010226070.

* cited by examiner

*Primary Examiner*—Patrick N. Edouard
*Assistant Examiner*—Lamont Spooner
(74) *Attorney, Agent, or Firm*—Lee Hayes, PLLC

(57) ABSTRACT

A method for the joint optimization of language model performance and size is presented comprising developing a language model from a tuning set of information, segmenting at least a subset of a received textual corpus and calculating a perplexity value for each segment and refining the language model with one or more segments of the received corpus based, at least in part, on the calculated perplexity value for the one or more segments.

32 Claims, 6 Drawing Sheets

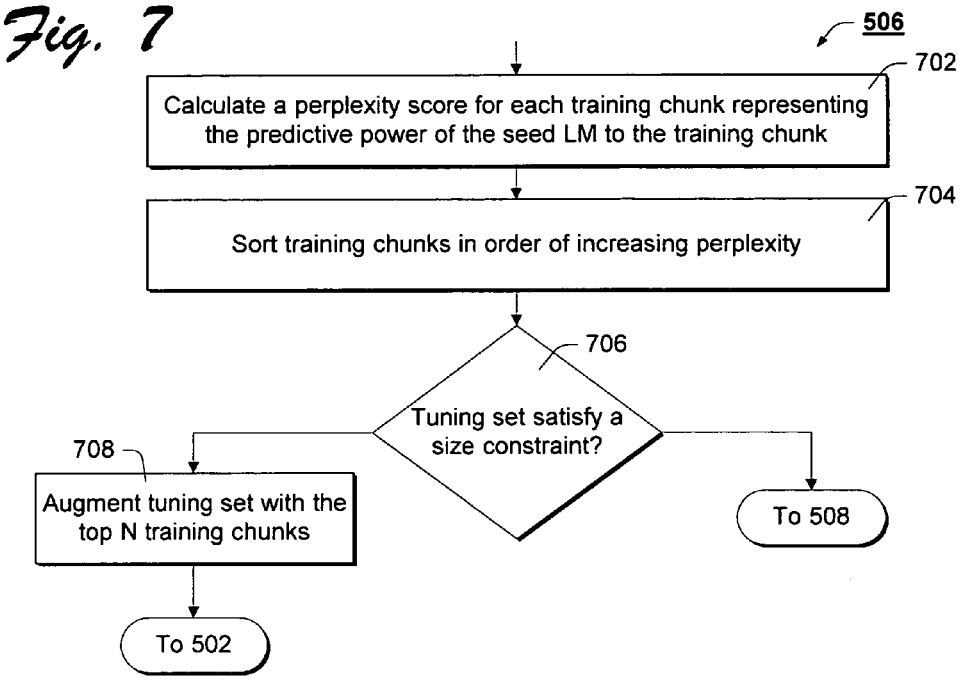
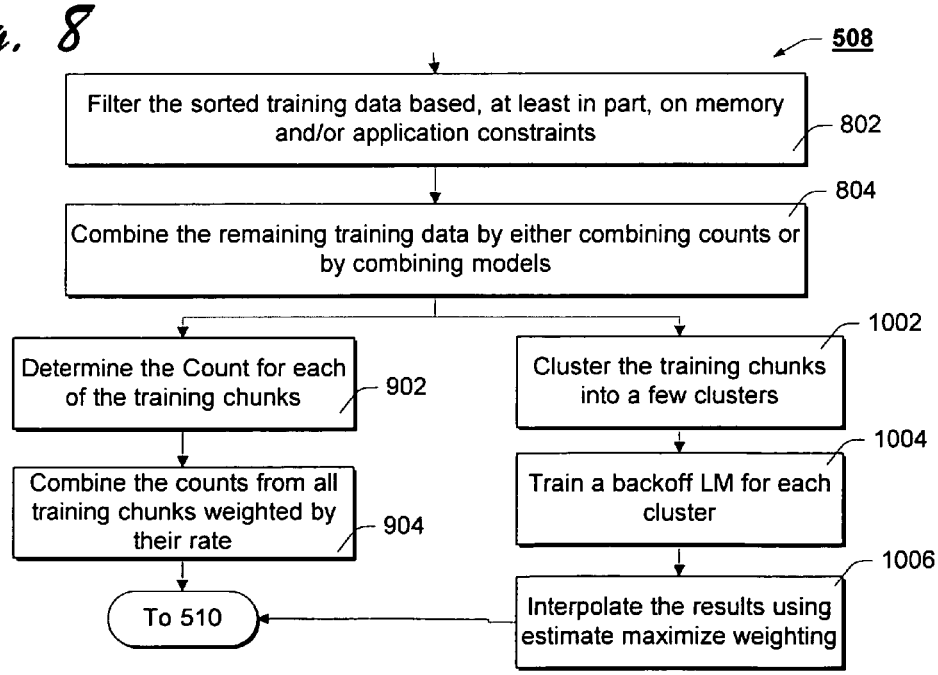

SYSTEM AND METHOD FOR JOINT OPTIMIZATION OF LANGUAGE MODEL PERFORMANCE AND SIZE

This application claims priority to a provisional patent application No. 60/163,851, entitled "A Method for Iterative Joint Optimization of Language Model Perplexity and Size", filed on Nov. 5, 1999 by the inventors of this application.

TECHNICAL FIELD

This invention generally relates to language modeling and, more specifically, to a system and method for iterative joint optimization of language model performance and size.

BACKGROUND

Recent advances in computing power and related technology have fostered the development of a new generation of powerful software applications including web-browsers, word processing and speech recognition applications. The latest generation of web-browsers, for example, anticipate a uniform resource locator (URL) address entry after a few of the initial characters of the domain name have been entered. Word processors offer improved spelling and grammar checking capabilities, word prediction, and language conversion. Newer speech recognition applications similarly offer a wide variety of features with impressive recognition and prediction accuracy rates. In order to be useful to an end-user, these features must execute in substantially real-time. To provide this performance, many applications rely on a tree-like data structure to build a simple language model.

Simplistically, a language model measures the likelihood of any given sentence. That is, a language model can take any sequence of items (words, characters, letters, etc.) and estimate the probability of the sequence. The estimation performed by language models are typically made using a simple lexicon (e.g., a word list) and a segmentation algorithm or rules. A common approach to building a prior art language model is to utilize a prefix tree-like data structure to build an N-gram language model from a known training set of a textual corpus.

The use of a prefix tree data structure (a.k.a. a suffix tree, or a PAT tree) enables a higher-level application to quickly traverse the language model, providing the substantially real-time performance characteristics described above. Simplistically, the N-gram language model counts the number of occurrences of a particular item (word, character, etc.) in a string (of size N) throughout a text. The counts are used to calculate the probability of the use of the item strings. Development of a typical tri-gram (N-gram where N=3) language model, for example, generally includes the steps of:

(a) dissecting a received textual corpus into a plurality of items (characters, letters, numbers, etc.);
(b) the items (e.g., characters (C)) are segmented (e.g., into words (W)) in accordance with a small, pre-defined lexicon and a simple, pre-defined segmentation algorithm, wherein each W is mapped in the tree to one or more C's;
(c) train a language model on the dissected corpus by counting the occurrence of strings of characters, from which the probability of a sequence of words ($W_1$, $W_2$, ... $W_M$) is predicted from the previous two words:

$$P(W_1, W_2, W_3, \ldots W_M) \approx \pi P(W_i | W_{i-1}, W_{i-2}) \quad (1)$$

The N-gram language model is limited in a number of respects. First, the counting process utilized in constructing the prefix tree is very time consuming. Thus, only small N-gram models (typically bi-gram, or tri-gram) can practically be achieved. Second, as the string size (N) of the N-gram language model increases, the memory required to store the prefix tree increases by $2^N$. Thus, the memory required to store the N-gram language model, and the access time required to utilize a large N-gram language model is prohibitively large for N-gram larger than three (i.e., a tri-gram).

As a consequence of these computational and architectural limitations, prior art implementations of N-gram language models tend to be very rigid. That is, prior art N-gram language models tend to use a standard (small) lexicon, a simplistic segmentation algorithm, and will typically only rely on the previous two words to predict the current word (in a tri-gram model).

A small lexicon limits the ability of the model to identify words to those contained in the lexicon. If a word is not in the lexicon, it does not exist as far as the model is concerned. Moreover, a basic multipurpose lexicon is not likely to represent the linguistic complexity or syntactic behavior of a particular application or style or writing. Thus, a small lexicon is not likely to cover the intended linguistic content of a given application.

The segmentation algorithms are often ad-hoc and not based on any statistical or semantic principles. A simplistic segmentation algorithm typically errors in favor of larger words over smaller words. Thus, the model is unable to accurately predict smaller words contained within larger, lexiconically acceptable strings.

As a result of the foregoing limitations, a language model using prior art lexicon and segmentation algorithms tends to be error prone. That is, any errors made in the lexicon or segmentation stage are propagated throughout the language model, thereby limiting its accuracy and predictive attributes.

In addition to the fundamental problems of a limited lexicon and a simplistic segmentation algorithm, the N-gram approach is fundamentally constrained by limiting the predictive features to at most the previous N-1 words. In the instance of a tri-gram (N=3) language mode (LM), the LM is limited to only the previous two words for context. These inherent limitations in the prior art of language modeling fundamentally constrain the accuracy of such language models.

In application, the prior art approach to language modeling may provide acceptable results in many alphabet-based languages with an accepted lexicon and well-defined segmentation. The aforementioned limitations inherent in such prior art language models are further exacerbated, however, when applied to numerical or character-based languages such as, for example, many Asian languages. The Chinese language, for example, is a character-based language with an expansive lexicon that is not well-defined, where single characters may form a word or may be combined with another character to form a multi-character word with a distinct and unique meaning in the language, and where there is limited punctuation to provide clues as to sentence structure, and the like. In such a language, lexicon and segmentation clues are difficult, at best, to come by. Prior art language modeling techniques provide very poor results when applied to such languages.

One proposed solution to improving the performance of a language model applied to character-based languages is to simply throw more data at the model, i.e., trade size for accuracy. The though is that more data provides a larger lexicon and basis for maximum match-based segmentation algorithms (to be defined more fully below) to refine the language model. An obvious consequence to this solution however, and a significant limitation in and of itself, is that to simply throw more data at the model significantly increases the memory requirements required to support the language model. Aside from the cost of providing the additional memory, larger language models place a greater computational burden on the host system/application utilizing the language model. The memory and computational consequences of the prior art solution typically result in a modest improvement in predicative capability. Moreover, as above, a huge data set does not necessarily provide an improved language model on a per-application basis.

Thus, a system and method for the joint optimization of language model performance and size is required, unencumbered by the deficiencies and limitations commonly associated with prior art language modeling techniques. Just such a solution is provided below.

SUMMARY

This invention concerns a system and method for iterative joint optimization of language model performance and size. To overcome the limitations commonly associated with the prior art, the present invention does not rely on a predefined lexicon or segmentation algorithm, but rather dynamically defines a lexicon and segmentation rules while iteratively refining a language model. According to one implementation, a method for the joint optimization of language model performance and size is presented comprising developing a language model from a tuning set of information, segmenting at least a subset of a received textual corpus and calculating a perplexity value for each segment and iteratively refining the language model with one or more segments of the received corpus based, at least in part, on the calculated perplexity value for the one or more segments.

According to one implementation, the received corpus, or subset thereof, is dissected into a plurality of training units, and a measure of similarity within, and disparity between each training unit is made. Based on these measures, gaps for training chunks are selected which maximize the similarity within the chunks and the disparity between chunks. A perplexity value is calculated for each of the chunks, using the seed language model. In one embodiment, if the tuning set is not large enough to provide a robust seed language model, the tuning set is augmented with chunks having a measured perplexity value that exceeds some threshold. In this instance, the seed language model is then re-trained and the perplexity calculations are once again performed on a per-chunk basis and represent a set of data on which the language model will be trained (e.g., training data).

According to one aspect of the invention, the size of the training data may well be reduced by application of a perplexity value filter. The filter eliminates chunks from the training data with too large a perplexity value. The remaining training data is then combined to form the language model training data. According to one implementation of the invention, the training data may be combined by combining counts from each of the training chunks. The "count" of a chunk is a measure of the probability of a word combination weighted by the perplexity of the chunk. The probability of a word is measured using, e.g., a tri-gram language model, wherein the probability of a word is measured using the prior two words.

According to another embodiment, the training data is combined by combining models for each of the chunks. This approach involves clustering training chunks into a few clusters by quantization, training a language model on a per-cluster basis, and interpolating them, wherein the interpolation weights are estimated using an estimate maximize method.

A resultant language model is then compressed according to one of a number of alternate techniques. According to one implementation, the language model compression is performed according to a relative entropy pruning algorithm. Simply stated, the relative entropy pruning algorithm employed herein eliminates as many chunks from the training set as necessary to satisfy memory and/or application constraints, while minimizing the effect on the performance of the resultant language model.

BRIEF DESCRIPTION OF THE DRAWINGS

The same reference numbers are used throughout the figures to reference like components and features.

FIG. 7 is a flow chart illustrating an example method for ranking the segments of the training set in order of perplexity;

FIG. 8 is a flow chart of an example method for combining the training data to train a language model according to two alternate embodiments of the invention.

DETAILED DESCRIPTION

This invention concerns a system and iterative method for the joint optimization of language model performance and size. In the discussion herein, the invention is described in the general context of computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, personal digital assistants, multiprocessor systems, microprocessor-based or programmable consumer electronics, network PCs, minicomputers, mainframe computers, and the like. In a distributed computer environment, program modules may be located in both local and remote memory storage devices. It is noted, however, that modification to the architecture and methods described herein may well be made without deviating from spirit and scope of the present invention.

Example Computer System

Figure 1:
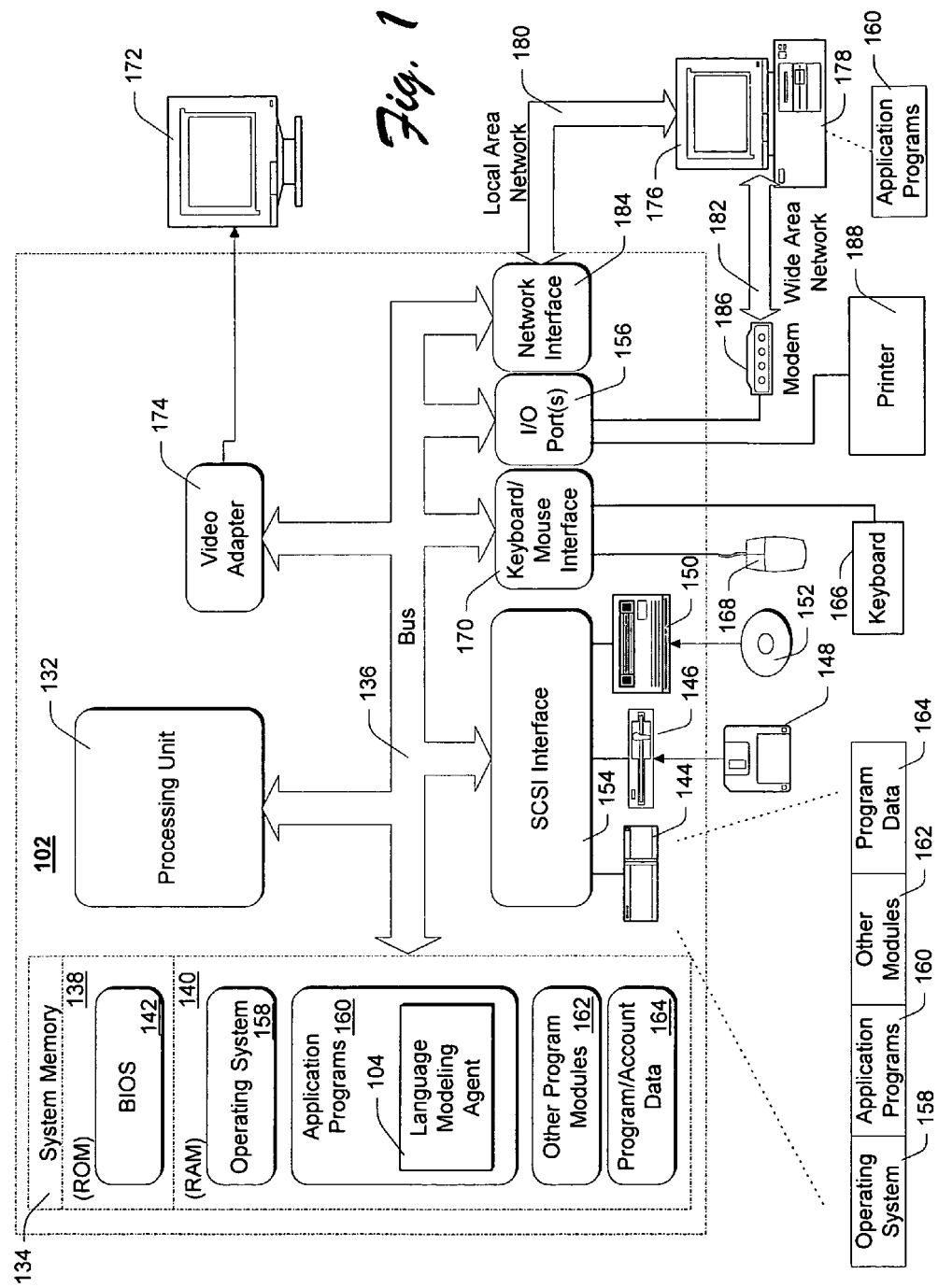
FIG. 1 is a block diagram of a computer system incorporating the teachings of the present invention.

FIG. 1 illustrates an example computer system 102 including an innovative language modeling agent (LMA) 104, to jointly optimize the performance and size of a language model, according to one embodiment of the present invention. As used herein, language model performance is quantified in terms of a "perplexity value". An equation for the perplexity value will be thoroughly developed below, however, for ease of understanding the perplexity value may be thought of as a language model predictive capability index. Simplistically speaking, the perplexity value calculated for an item (character, letter, number, word, etc.) is inversely related to the probability that the item appears in a given context. Thus, lower perplexity values are better.

According to the teachings of the present invention, LMA 104 iteratively refines the language model to improve performance, while simultaneously reducing the size of the language model in accordance with system memory and/or application constraints. It should be appreciated that although depicted as a separate, stand along application in FIG. 1, language modeling agent 104 may well be implemented as a function of an application, e.g., word processor, web browser, speech recognition system, etc. Moreover, although depicted as a software application, those skilled in the art will appreciate that the innovative modeling agent may well be implemented in hardware, e.g., a programmable logic array (PLA), a special purpose processor, an application specific integrated circuit (ASIC), microcontroller, and the like.

As used herein, computer 102 is intended to represent any of a class of general or special purpose computing platforms which, when endowed with the innovative language modeling agent (LMA) 104, implement the teachings of the present invention in accordance with the first example implementation introduced above. In this regard, but for the description of LMA 104, the following description of computer system 102 is intended to be merely illustrative, as computer systems of greater or lesser capability may well be substituted without deviating from the spirit and scope of the present invention.

As shown, computer 102 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 102, such as during start-up, is stored in ROM 138. Computer 102 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM, DVD ROM or other such optical media. The hard disk drive 144, magnetic disk drive 146, and optical disk drive 150 are connected to the bus 136 by a SCSI interface 154 or some other suitable bus interface. The drives and their associated computer-readable media provide nonvolatile storage of computer readable instructions, data structures, program modules and other data for computer 102.

Although the exemplary environment described herein employs a hard disk 144, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk 144, magnetic disk 148, optical disk 152, ROM 138, or RAM 140, including an operating system 158, one or more application programs 160 including, for example, the innovative LMA 104 incorporating the teachings of the present invention, other program modules 162, and program data 164 (e.g., resultant language model data structures, etc.). A user may enter commands and information into computer 102 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to bus 136. A monitor 172 or other type of display device is also connected to the bus 136 via an interface, such as a video adapter 174. In addition to the monitor 172, personal computers often include other peripheral output devices (not shown) such as speakers and printers.

As shown, computer 102 operates in a networked environment using logical connections to one or more remote computers, such as a remote computer 176. The remote computer 176 may be another personal computer, a personal digital assistant, a server, a router or other network device, a network "thin-client" PC, a peer device or other common network node, and typically includes many or all of the elements described above relative to computer 102, although only a memory storage device 178 has been illustrated in FIG. 1.

As shown, the logical connections depicted in FIG. 1 include a local area network (LAN) 180 and a wide area network (WAN) 182. Such networking environments are commonplace in offices, enterprise-wide computer networks, Intranets, and the Internet. In one embodiment, remote computer 176 executes an Internet Web browser program such as the "Internet Explorer" Web browser manufactured and distributed by Microsoft Corporation of Redmond, Wash. to access and utilize online services.

When used in a LAN networking environment, computer 102 is connected to the local network 180 through a network interface or adapter 184. When used in a WAN networking environment, computer 102 typically includes a modem 186 or other means for establishing communications over the wide area network 182, such as the Internet. The modem 186, which may be internal or external, is connected to the bus 136 via a input/output (I/O) interface 156. In addition to network connectivity, I/O interface 156 also supports one or more printers 188. In a networked environment, program modules depicted relative to the personal computer 102, or portions thereof, may be stored in the remote memory storage device. It will be appreciated that the network connections shown are exemplary and other means of establishing a communications link between the computers may be used.

Generally, the data processors of computer 102 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the innovative steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Example Language Modeling Agent

Figure 2:
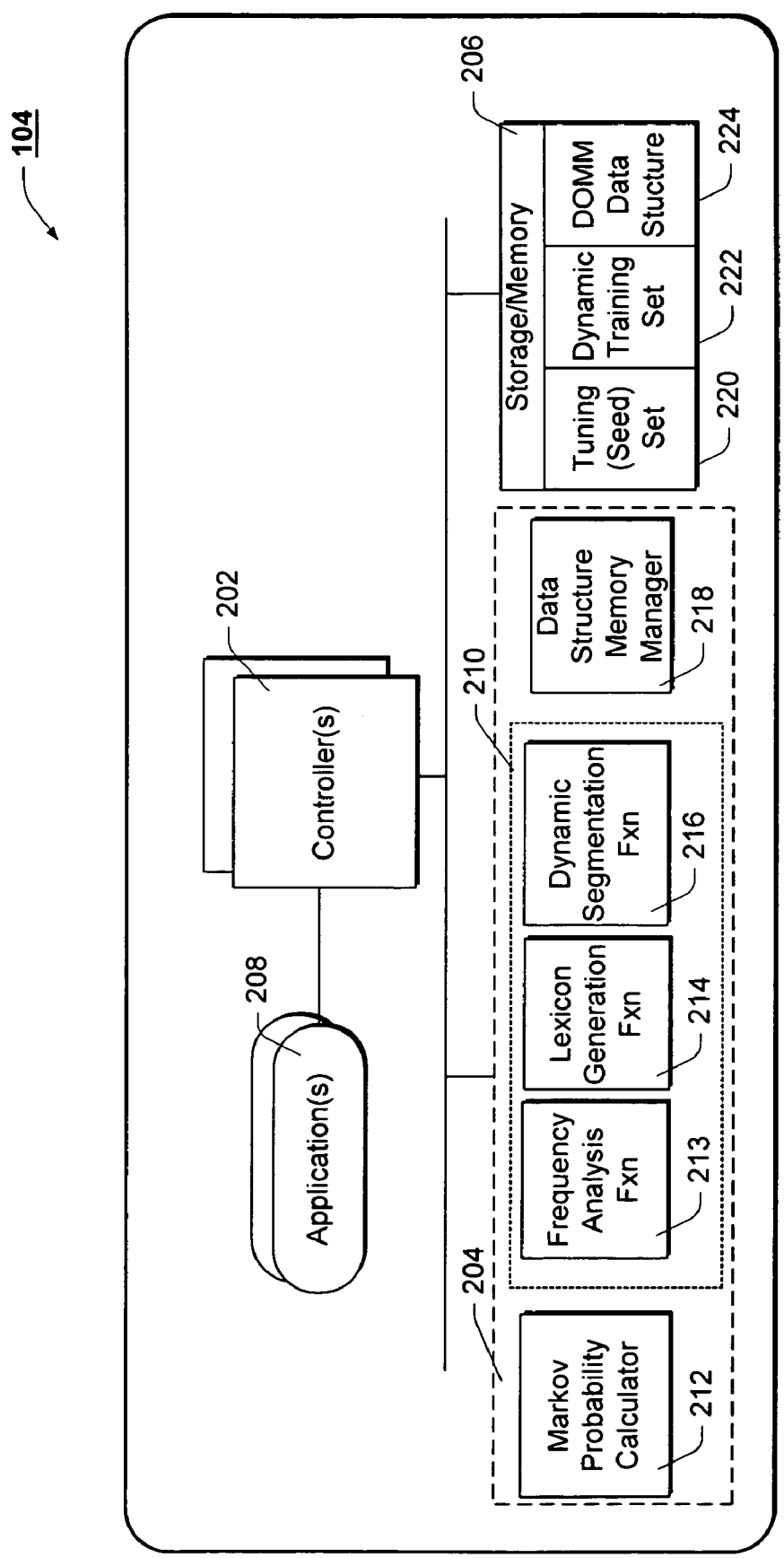
FIG. 2 is a block diagram of an example modeling agent incorporating the teachings of the present invention.

FIG. 2 illustrates a block diagram of an example language modeling agent (LMA) 104, incorporating the teachings of the present invention. As shown, language modeling agent 104 is comprised of one or more controllers 202, an innovative analysis engine 204, storage/memory device(s) 206 and, optionally, one or more additional applications (e.g., graphical user interface, prediction application, verification application, estimation application, language conversion application, etc.) 208, each communicatively coupled as shown. It will be appreciated that although depicted in FIG. 2 as a number of disparate blocks, one or more of the functional elements of the LMA 104 may well be combined. In this regard, modeling agents of greater or lesser complexity, which jointly optimize language model perplexity and size may well be employed without deviating from the spirit and scope of the present invention.

As alluded to above, although depicted as a separate functional element, LMA 104 may well be implemented as a function of a higher-level application, e.g., a word processor, web browser, speech recognition system, or a language conversion system. In this regard, controller(s) 202 of LMA 104 are responsive to one or more instructional commands from a parent application to selectively invoke the features of LMA 104. Alternatively, LAM 104 may well be implemented as a stand-along language modeling tool, providing a user with a user interface (208) to selectively implement the features of LMA 104 discussed below. In either case, controller(s) 202 of LMA 104 selectively invoke one or more functions of analysis engine 204 (described more fully below) to jointly optimize language model performance and size. In this regard, controller 202 may receive a size constraint from a calling application, or independently identifies architectural memory constraints to determine the size of a generated language model.

As will be described more fully below, to jointly optimize language model performance and size, controller 202 iteratively refines a language model using a large textual corpus. The textual corpus is received and stored by controller 202 in storage device 208. Controller 202 begins the iterative optimization process with a "seed" language model developed from a tuning set of information, described more fully below. As above, the tuning set of information is received and stored by controller 202 in storage device 208.

Except as configured to effect the teachings of the present invention, controller 202 is intended to represent any of a number of alternate control systems known in the art including, but not limited to, a microprocessor, a programmable logic array (PLA), a micro-machine, an application specific integrated circuit (ASIC) and the like. In an alternate implementation, controller 202 is intended to represent a series of executable instructions to implement the control logic described above.

As shown, the innovative analysis engine 204 is comprised a Markov probability calculator 212, a frequency calculation function 210, a dynamic lexicon generation function 214, a dynamic segmentation function 216, and a data structure memory manager 218. Upon receiving an external indication, controller 202 selectively invokes an instance of the analysis engine 204 to develop, modify and optimize the performance and size of a statistical language model (SLM).

Analysis engine 204 invokes an instance of frequency analysis function 210 to identify the frequency and dependencies of items comprising at least a subset of a received corpus (training set), to build a prefix tree data structure from the items (e.g., letters, characters, numbers, etc.).

Frequency calculation function 213 identifies a frequency of occurrence for each item (character, letter, number, word, etc.) in the training set subset. Based on inter-node dependencies, data structure generator 218 assigns each item to an appropriate node of the DOMM tree, with an indication of the frequency value ($C_i$) and a compare bit ($b_i$).

The Markov probability calculator 212 calculates the probability of an item (character, letter, number, etc.) from a context (j) of associated items. More specifically, according to the teachings of the present invention, the Markov probability of a particular item ($C_i$) is dependent on as many previous characters as data "allows", in other words.

$$P(C_1, C_2, C_3, \ldots, C_N) \approx \pi P(C_i | C_{i-1}, C_{i-2}, C_{i-3}, \ldots, C_j) \quad (2)$$

The number of characters employed as context (j) by Markov probability calculator 212 is a "dynamic" quantity that is different for each sequence of characters $C_i$, $C_{i-1}$, $C_{i-2}$, $C_{i-3}$, etc. According to one implementation, the number of characters relied upon for context (j) by Markov probability calculator 212 is dependent, at least in part, on a frequency value for each of the characters, i.e., the rate at which they appear throughout the corpus. More specifically, if in identifying the items of the corpus Markov probability calculator 212 does not identify at least a minimum occurrence frequency for a particular item, it may be "pruned" (i.e., removed) from the tree as being statistically irrelevant. According to one embodiment, the minimum frequency threshold is three (3). Alternatively, Markov probability calculator can also develop N-gram language models from a training set.

As alluded to above, analysis engine 204 does not rely on a fixed lexicon or a simple segmentation algorithm (both of which tend to be error prone). Rather, analysis engine 204 selectively invokes a dynamic segmentation function 216 to segment items (characters or letters, for example) into strings (e.g., words). More precisely, segmentation function 216 segments the training set 222 into subsets (chunks) and calculates a cohesion score (i.e., a measure of the similarity between items within the subset). The segmentation and cohesion calculation is iteratively performed by segmentation function 216 until the cohesion score for each subset reaches a predetermined threshold.

The lexicon generation function 214 is invoked to dynamically generate and maintain a lexicon 220 in memory 206. According to one implementation, lexicon generation function 214 analyzes the segmentation results and generates a lexicon from item strings with a Markov transition probability that exceeds a threshold. In this regard, lexicon generation function 214 develops a dynamic lexicon 220 from item strings which exceed a pre-determined Markov transition probability taken from one or more language models developed by analysis engine 204. Accordingly, unlike prior art language models which rely on a known, fixed lexicon that is prone to error, analysis engine 204 dynamically generates a lexicon of statistically significant, statistically accurate item strings from one or more language models developed over a period of time. According to one embodiment, the lexicon 220 comprises a "virtual corpus" that Markov probability calculator 212 relies on (in addition to the dynamic training set) in developing subsequent language models.

Analysis engine 204 accesses information in storage device 208 by invoking an instance data structure memory manager 218. According to one aspect of the invention, data structure memory manager 218 utilizes system memory as well as extended memory to maintain the resultant language model data structure.

Example Data Structure—Dynamic Order Markov Model (DOMM) Tree

Figure 3:
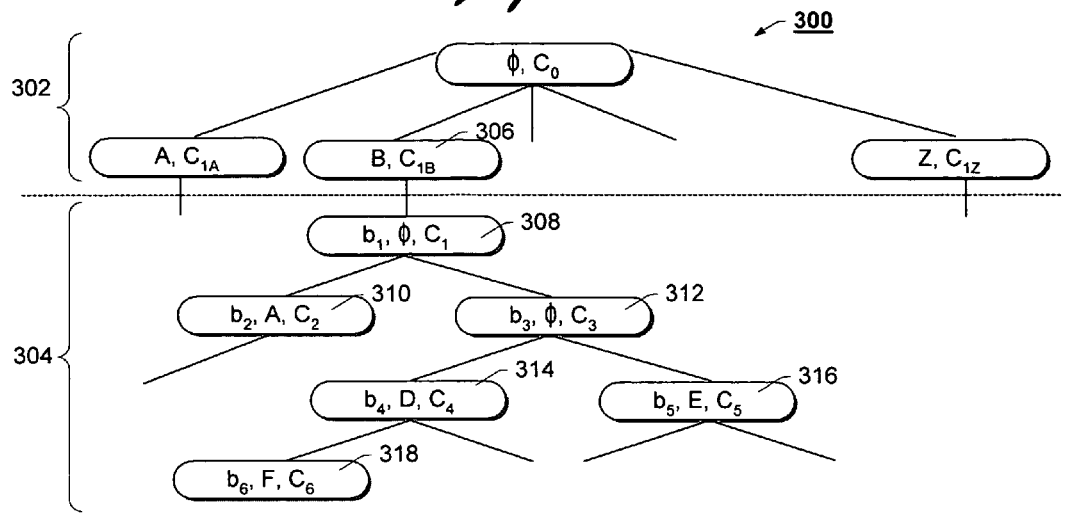
FIG. 3 is a graphical representation of a prefix tree language model data structure according to one aspect of the present invention.

FIG. 3 graphically represents a conceptual illustration of an example Dynamic Order Markov Model tree-like data structure 300, according to the teachings of the present invention. To conceptually illustrate how a DOMM tree data structure 300 is configured, FIG. 3 presents an example DOMM data structure 300 for a language model developed from the English alphabet, i.e., A, B, C, . . . Z. As shown the DOMM tree 300 is comprised of one or more root nodes 302 and one or more subordinate nodes 304, each associated with an item (character, letter, number, word, etc.) of a textual corpus, logically coupled to denote dependencies between nodes. According to one implementation of the present invention, root nodes 302 are comprised of an item and a frequency value (e.g., a count of how many times the item occurs in the corpus). At some level below the root node level 302, the subordinate nodes are arranged in binary sub-trees, wherein each node includes a compare bit ($b_i$), an item with which the node is associated (A, B, . . . ), and a frequency value ($C_N$) for the item.

Thus, beginning with the root node associated with the item B 306, a binary sub-tree is comprised of subordinate nodes 308-318 denoting the relationships between nodes and the frequency with which they occur. Given this conceptual example, it should be appreciated that starting at a root node, e.g., 306, the complexity of a search of the DOMM tree approximates log(N), where N is the total number of nodes to be searched.

As alluded to above, the size of the DOMM tree 300 may exceed the space available in the memory device 206 of LMA 104 and/or the main memory 140 of computer system 102. Accordingly, data structure memory manager 218 facilitates storage of a DOMM tree data structure 300 across main memory (e.g., 140 and/or 206) into an extended memory space, e.g., disk files on a mass storage device such as hard drive 144 of computer system 102.

Example Operation and Implementation

Having introduced the functional and conceptual elements of the present invention with reference to FIGS. 1-3, the operation of the innovative language modeling agent 104 will now be described with reference to FIGS. 4-9.

Building DOMM Tree Data Structure

Figure 4:
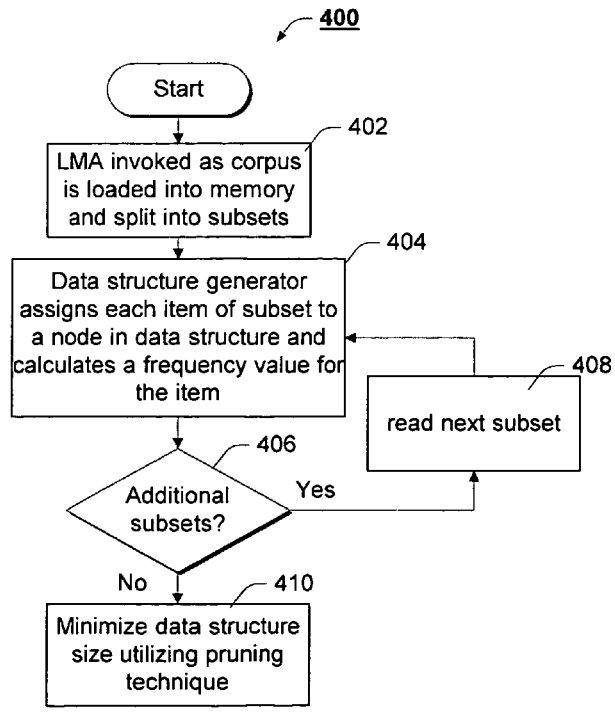
FIG. 4 is a flow chart of an example method for building a prefix tree.

FIG. 4 is a flow chart of an example method for building a Dynamic Order Markov Model (DOMM) data structure, according to one aspect of the present invention. As alluded to above, language modeling agent 104 may be invoked directly by a user or a higher-level application. In response, controller 202 of LMA 104 selectively invokes an instance of analysis engine 204, and a textual corpus (or a subset thereof) is loaded into memory 206 as a dynamic training set 222 and split into subsets (e.g., sentences, lines, etc.), block 402. In response, data structure generator 210 assigns each item of the subset to a node in data structure and calculates a frequency value for the item, block 404. According to one implementation, once data structure generator has populated the data structure with the subset, frequency calculation function 213 is invoked to identify the occurrence frequency of each item within the training set subset.

In block 406, data structure generator 210 determines whether additional subsets of the training set remain and, if so, the next subset is read in block 408 and the process continues with block 404. In alternate implementation, data structure generator 210 completely populates the data structure, a subset at a time, before invocation of the frequency calculation function 213. In alternate embodiment, frequency calculation function 213 simply counts each item as it is placed into associated nodes of the data structure.

If, in block 406 data structure generator 210 has completely loaded the data structure 300 with items of the training set 222, data structure generator 210 may optionally prune the data structure, block 410. A number of mechanisms may be employed to prune the resultant data structure 300.

Example Method for Joint Optimization of Language Model Performance and Size

Figure 5:
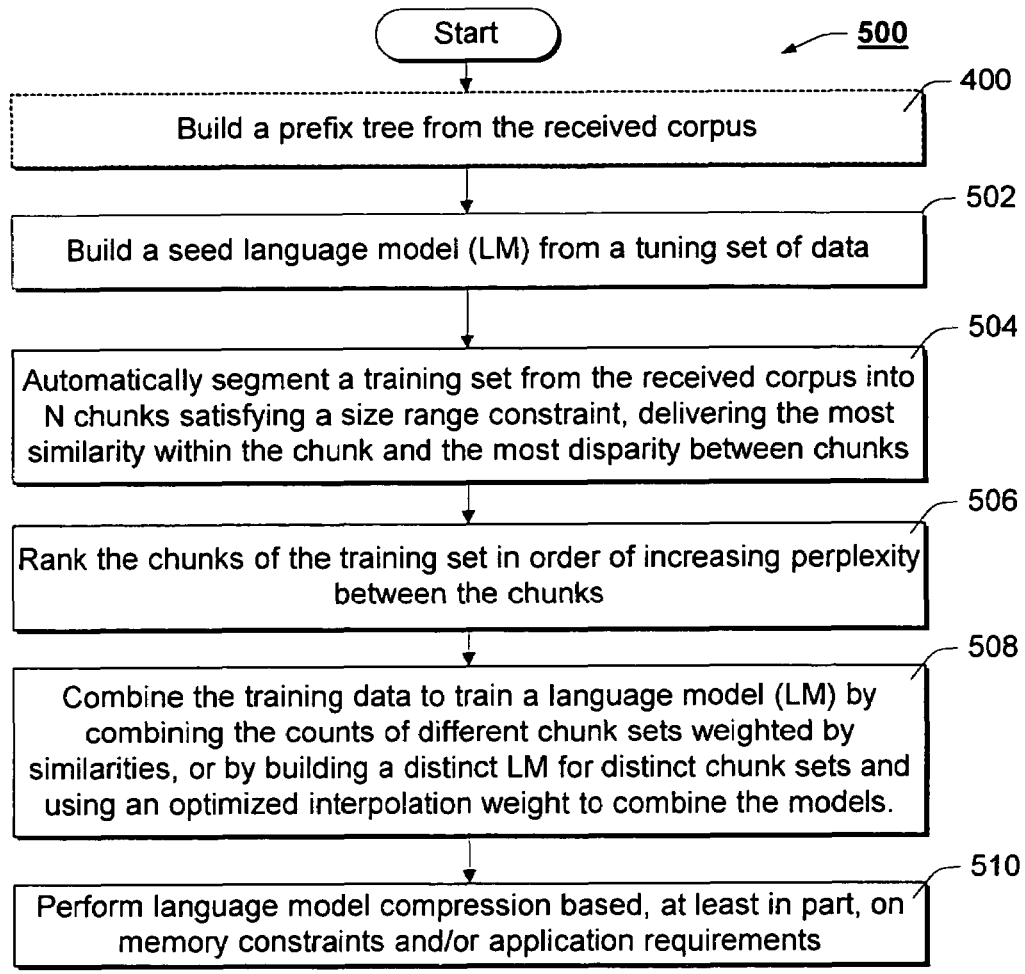
FIG. 5 is a flow chart of an example method for the joint optimization of language model performance and size, according to the teachings of the present invention.

FIG. 5 is a flow chart of an example method for joint optimization of language model performance and size, according to one embodiment of the present invention. As shown, the method begins with block 400 wherein LM 104 is invoked and a prefix tree of at least a subset of the received corpus is built. More specifically, as detailed in FIG. 4, data structure generator 210 of modeling agent 104 analyzes the received corpus and selects at least a subset as a training set, from which a DOMM tree is build.

In block 502, an initial language model is built from a tuning set of data received or selected by controller 202. According to one embodiment, when invoked by a higher level application, the application may provide LMA 104 with a tuning set of data from which to generate a language model. Preferably, the tuning set is comprised of one or more documents of scrubbed, application specific data representative of the linguistic and syntactic complexity for which the language model is intended. In this regard, the tuning set is preferably provided by a calling application. Alternatively, controller 202 may generate its own tuning set from stored documents, generate a tuning set from a prior language model, or utilize a default tuning set. The language model generated from the tuning set is referred to as the seed language model, or seed LM.

According to one implementation, controller 202 invokes an instance of Markov probability calculator (described above) to generate the seed LM from the tuning set. Alternatively, controller 202 may employ any of a number of prior art language modeling techniques such as, for example, a tri-gram language modeling technique. In either case, the seed language model will be refined with information from the received corpus to improve performance of the language model, while compressing the language model according to memory and/or application constraints.

Once the seed LM is developed, LMA 104 automatically segments a training set from the received corpus into a number (N) of chunks, block 504. According to one implementation, to be described more fully below, controller 202 invokes an instance of dynamic segmentation function 216 to automatically segment the corpus a number of chunks (N) satisfying a size range constraint (e.g., 500 items), maximizing the similarity within chunks and the disparity between chunks.

Once segmented, controller 202 ranks the chunks of the training set in order of increasing perplexity between the chunks, block 506. According to one implementation, controller 202 calculates a perplexity value for each of the chunks, wherein the perplexity value represents the prediction power of the current iteration of the language model to the training chunk. More particularly, the perplexity value quantifies the possible number of words following a word in the training chunk on average based on the prediction of the current iteration of the language model. According to one implementation, controller 202 utilizes the following perplexity value equation:

$$PP = 2^{(\frac{1}{N})\Sigma_{ii=1}^{N} \text{Log}P(wi|wi-1)} \quad (4)$$

As shown above, N represents the length (number of items) in the training chunk; P represents the probability of a word ($w_i$) given an immediately preceding word ($w_{i-1}$), e.g., a bi-gram language model. Thus, the perplexity value represents the prediction power with the certain language model to the training chunk. Starting with the seed LM, the complexity of word frequencies and word associations conceived in the application providing the tuning set can be modeled. In other words, the present invention provides for custom language models particularly relevant for poetry, scientific descriptions, mathematical proofs, Chinese language modeling, etc.

Once the training set has been ranked, the training data is combined to develop a trigram backoff language model, block 508. In this regard, controller 202 may combine the training data in any of a number of ways. For purposes of illustration, controller 202 may well combine the training chunks by combining the "counts" (or probabilities) of different chunk sets weighted by a measure of similarity within the chunk set. Alternatively, controller 202 may build a distinct LM for each distinct chunk and, utilizing an optimized interpolation algorithm, combine the models of the individual language models. Both will be described in greater detail below, with reference to FIG. 8.

Once the training data is combined, LMA 104 performs language model compression based, at least in part, on memory and/or application constraints. More particularly, once controller 202 has developed an initial language model by combining the training data, the language model is iteratively refined to accommodate the size constraints while minimizing any adverse affect on language model performance, block 510. According to one aspect of the present invention, controller 202 utilizes a relative entropy-based pruning algorithm. Conceptually, controller 202 removes as many un(der)-utilized probabilities as possible without increasing the language model perplexity. In this regard, controller 202 examines the weighted relative entropy between each probability P(w|h) and its value P'(w|h') from the backoff distribution. Mathematically, the this distance is expressed as follows:

$$D(P(w|h), P'(w|h')) = P(w|h) * \log(P(w|h)/P'(w|h')) \quad (5)$$

As used herein, h is a history and h' is a reduced history. For small distances the backoff probability itself is good approximation and P(w|h) does not carry much additional information. In such a case, controller 202 deletes this probability from the model. The deleted probability mass is reassigned to the backoff distribution, and controller 202 recalculates the backoff weights.

Figure 6:
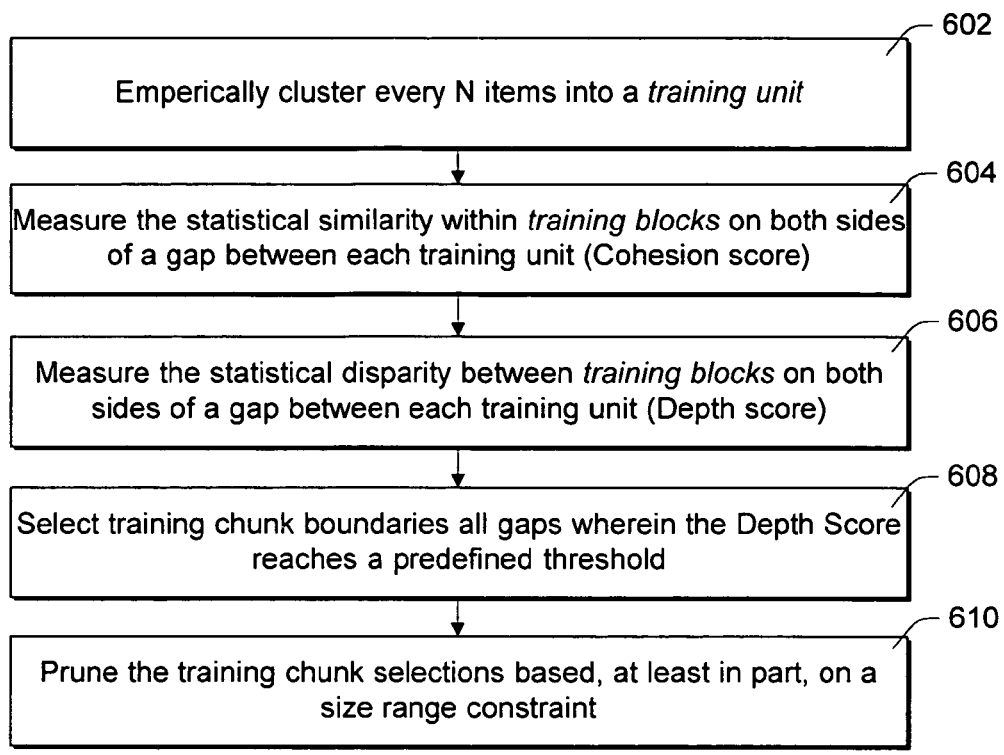
FIG. 6 is a flow chart detailing an example method for automatically segmenting a training set from a received corpus.

Having introduced the innovative operation of language modeling agent 104, more detailed flow charts are presented in FIGS. 6-8 detailing aspects of the invention.

FIG. 6 illustrates a flow chart of an example method for automatically segmenting at least a subset of the received corpus, according to one implementation of the invention. As shown, the method begins in block 602 wherein dynamic segmentation function 216 empirically clusters every N items into a training unit. According to one implementation, a training unit is comprised of 500 non-stop items.

In block 604, controller 202 measures the statistical similarity within a sequence of training units, referred to as a training block, on each side of a gap separating training units. The measure of similarity between training blocks on each side of a gap is referred to as a Cohesion score. According to one implementation, the cohesion score is estimated by computing a correlation coefficient of term vectors of the training blocks. One measure of such term vectors is the well-known Term Frequency Inverse Document Frequency (TFIDF). According to the illustrated example implementation, however, the term vectors are estimated using only the term frequency, without taking into account the inverse document frequency. In this regard, controller 202 invokes an instance of frequency analysis function 213 to identify term frequency rates.

In block 606, controller 202 measures the statistical disparity between training blocks on both sides of a gap between each training unit. The measure of disparity, or the difference between the training blocks, is referred to as a Depth score. The depth score at a gap can be estimated be calculating the difference in cohesion scores on either side of the gap. Mathematically, the depth score may be represented as:

$$D = (s_{i-1} - s_i) + (s_{i+1} - s_i) \quad (6)$$

In the equation above, $s_i$ is the cohesion score at gap i.

In block 608, segmentation function 216 selects training chunk boundaries at gaps wherein the depth score reaches a dynamically defined threshold. According to one implementation, the threshold is dynamically defined as a function of the mean ($\mu$) and variance ($\sigma$) of the computed depth scores. In this implementation, a gap is selected wherein the depth score of the gap is higher than $\mu - c\sigma$, where c is a weighting factor (e.g., 5).

Once the training chunk boundaries are selected, block 608, the training set is further refined by pruning the training chunks according to a size range constraint, block 610. According to one implementation, segmentation function 216 utilizes a size range constraint to avoid too small or too large training chunks in the resultant training set. In one implementation, segmentation function 216 utilizes a size range constraint to ensure training chunks of an average 10 kB size Once the training set has been segmented into training chunks (FIG. 6), the training chunks are ranked according to a perplexity score. FIG. 7 illustrates a flow chart of an example method for ranking training chunks according to the teachings of the present invention. As shown, the method begins with block 702 wherein controller 202 calculates a perplexity score for each training chunk representing the predictive power of the current LM to the training chunk. According to one implementation, introduced above, controller 202 utilizes the perplexity calculation (equation 5) to calculate a perplexity value for each of the training chunks of the refined training set.

In block 704, controller 202 sorts the training chunks according to their measured perplexity. According to one implementation, controller 202 sorts the training chunks in order of increasing perplexity.

In block 706, a controller 202 determines whether the tuning set 220 is large enough to satisfy a size constraint. If the tuning set is not large enough, there is a risk that the resultant seed language model is impaired, which is then propagated to the resultant language model through flawed perplexity calculations and training chunk rankings. To alleviate this problem, controller 202 utilizes a dynamic size constraint, e.g., a function of the size of the received corpus, to test the size of the tuning set. If the tuning set is large enough to satisfy this size constraint, the process continues with combining of the training chunks, block 508 (detailed in FIG. 8).

If, however, the tuning set does not satisfy the size constraint, controller 202 augments the tuning set with the top N training chunks, block 708. That is, controller 202 identifies the top N chunks with the lowest measured perplexity, and adds the items represented by these chunks to the tuning set. In this way, the tuning set is increased to meet the size range constraints, and is augmented with the best available data. Once the tuning set has been augmented, the process of blocks 502 through 506 (FIG. 5) must be repeated, albeit with the improved tuning set.

FIG. 8 illustrates a flow chart of an example method for combining the resultant training chunks for language model training, block 508. As shown, the method begins with block 802, wherein controller 202 filters the ranked training chunks based, at least in part, on the received memory and/or application constraints. Unlike prior art methods of filtering, however, controller 202 does not simply remove the chunks with a poor perplexity measure. Rather, controller 202 keeps a certain number of similar chunks with relatively low perplexity and throws out "bad" chunks, e.g., those with a perplexity value exceeding some threshold.

In block 804, the remaining training chunks are combined using one of two alternate methods, colloquially referred to as (1) combining counts, or (2) combining models. To represent the divergent methods, the flow chart of FIG. 8 illustrates a dashed line departing block 804 to block 902 or block 1002. Each of the divergent paths represent alternate methods for combining the training chunks.

The combining counts method begins at block 902, wherein controller 202 determines the count (frequency) for each of the disparate training chunks. According to one implementation, controller 202 calculates the count using the equation:

$$C(w_i, w_{i-1}, w_{i-2}) = \lambda_j C^j(w_i, w_{i-1}, w_{i-2}) \qquad (7)$$

In the equation above, $C^j(w_i, w_{i-1}, w_{i-2})$ is the count of the trigram within training chunk j, and is weighted with a measure of the training chunk perplexity ($\lambda_j$). The weighting measure $\lambda_j$ is defined by the following equation:

$$\lambda_j = (1/PP_j)/(1/PP_o) \qquad (8)$$

That is, the weighting value is the ration of the perplexity of the training chunk j to the perplexity of the tuning set.

Once the count for each of the training chunks is determined, the counts from the training chunks are combined, weighted by their occurrence frequency throughout the training set, block 904.

Combining Models

An alternative approach to combining the training chunks is the combining models approach. As shown, the process begins with block 1002 wherein controller 202 clusters the training chunks into a few clusters. According to one embodiment, controller 202 clusters the training chunks into a few clusters by quantization, e.g., clustering training units with a similar perplexity value.

Once clustered, controller trains a language model for each of the clusters. According to one implementation, controller 202 invokes an instance of Markov probability calculator 212 to generate the cluster language models. In alternate embodiments, N-gram language models are utilized by controller 202.

In either case, the resultant cluster language models are interpolated, wherein the interpolation weights are estimated using an estimated maximize algorithm (also known as a forward-backward algorithm) which is an iterative procedure (or a gradient descent technique) for parameter optimization.

According to one embodiment, the resultant cluster language models are merged to form a composite language model "mixture". Initial experimental results indicate that such a merging may be performed without a degradation in LM performance, and offers computational decoding advantages. According to one embodiment, the language model is merged using linear interpolation. That is, the probability of a word, w, is the linear interpolation of 2 merge LMs i.e., P(w)=P1(w)+alpha*P2(w), where P1(w) is the probability from LM1, P2(w) is from LM2, and where alpha is the interpolation weight which is estimated by using EM algorithm.

Alternate Embodiments

Figure 9:
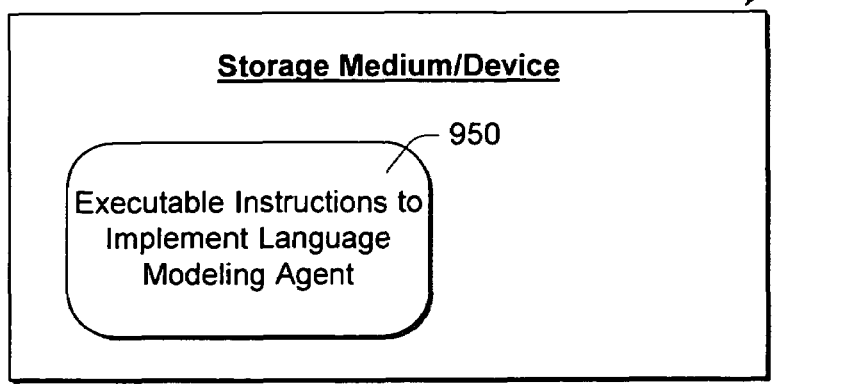
FIG. 9 is a storage medium with a plurality of executable instructions which, when executed, implement the innovative modeling agent of the present invention, according to an alternate embodiment of the present invention.

FIG. 9 is a block diagram of a storage medium having stored thereon a plurality of instructions including instructions to implement the innovative modeling agent of the present invention, according to yet another embodiment of the present invention. In general, FIG. 9 illustrates a storage medium/device 900 having stored thereon a plurality of executable instructions 950 including at least a subset of which that, when executed, implement the innovative modeling agent 104 of the present invention. When executed by a processor of a host system, the executable instructions 950 implement the modeling agent to generate a statistical language model representation of a textual corpus for use by any of a host of other applications executing on or otherwise available to the host system.

As used herein, storage medium 900 is intended to represent any of a number of storage devices and/or storage media known to those skilled in the art such as, for example, volatile memory devices, non-volatile memory devices, magnetic storage media, optical storage media, and the like. Similarly, the executable instructions are intended to reflect any of a number of software languages known in the art such as, for example, C++, Visual Basic, Hypertext Markup Language (HTML), Java, eXtensible Markup Language (XML), and the like. Moreover, it is to be appreciated that the storage medium/device 900 need not be co-located with any host system. That is, storage medium/device 900 may well reside within a remote server communicatively coupled to and accessible by an executing system. Accordingly, the software implementation of FIG. 9 is to be regarded as illustrative, as alternate storage media and software embodiments are anticipated within the spirit and scope of the present invention.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. A method of using a tuning set of information to jointly optimize the performance and size of a language model, comprising:
   providing a textual corpus comprising subsets wherein each subset comprises a plurality of items;
   creating a Dynamic Order Markov Model data structure by assigning each item of the plurality of items to a node in the data structure, wherein the nodes are logically coupled to denote dependencies of the items, and calculating a frequency of occurrence for each item of the plurality of items;
   segmenting at least a subset of a received textual corpus into segments by clustering every N-items of the received corpus into a training unit, wherein resultant training units are separated by gaps, and wherein N is an empirically derived value based, at least in part, on the size of the received corpus;
   creating the tuning set from application-specific information;
   (a) training a seed model via the tuning set;
   (b) calculating a similarity within a sequence of the training units on either side of each of the gaps;
   (c) selecting segment boundaries that maximize intra-segment similarity and inter-segment disparity;
   (d) calculating a perplexity value for each segment based on a comparison with the seed model;
   (e) selecting some of the segments based on their respective perplexity values to augment the tuning set;
   iteratively refining the tuning set and the seed model by repeating steps (a) through (e) with respect to a threshold;
   refining the language model based on the seed model;
   generating the language model that is representative of the textual corpus for use by a host of applications; and
   providing recognition of the textual corpus based on the language model.

2. A method according to claim 1, wherein the tuning set of information is comprised of one or more application-specific documents.

3. A method according to claim 1, wherein the tuning set of information is a highly accurate set of textual information linguistically relevant to, but not taken from, the received textual corpus.

4. A method according to claim 1, further comprising a training set comprised of at least the subset of the received textual corpus.

5. A method according to claim 4, further comprising:
   ranking the segments of the training set based, at least in part, on the calculated perplexity value for each segment.

6. A method according to claim 1, wherein the calculation of the similarity within a sequence of training units defines a cohesion score.

7. A method according to claim 6, wherein intra-segment similarity is measured by the cohesion score.

8. A method according to claim 6, wherein inter-segment disparity is approximated from the cohesion score.

9. A method according to claim 1, wherein the calculation of inter-segment disparity defines a depth score.

10. A method according to claim 1, wherein the perplexity value is a measure of the predictive power of a certain language model to a segment of the received corpus.

11. A method according to claim 1, further comprising:
    ranking the segments of at least the subset of the received corpus based, at least in part, on the calculated perplexity value of each segment; and
    updating the tuning set of information with one or more of the segments from at least the subset of the received corpus.

12. A method according to claim 11, wherein one or more of the segments with the lowest perplexity value from at least the subset of the received corpus are added to the tuning set.

13. A method according to claim 1, further comprising:
    utilizing the refined language model in an application to predict a likelihood of another corpus.

14. A storage medium comprising a plurality of executable instructions including at least a subset of which, when executed, implement a method according to claim 1.

15. A system comprising:
    a storage medium having stored therein a plurality of executable instructions; and
    an execution unit, coupled to the storage medium, to execute at least a subset of the plurality of executable instructions to implement a method according to claim 1.

16. The method as recited in claim 1, further comprising pruning the Dynamic Order Markov Model data structure.

17. A modeling agent comprising:
    a controller, to receive invocation requests to develop a language model from a textual corpus comprising subsets wherein each subset comprises a plurality of items and to calculate a frequency of occurrence for each item of the plurality of items; and
    a data structure generator, responsive to the controller to:
      create a Dynamic Order Markov Model data structure by assigning each item of the plurality of items to a node in the data structure, wherein the nodes are logically coupled to denote dependencies of the items;
      develop a seed model from a tuning set of information;
      segment at least a subset of a received corpus, wherein the segments of the received corpus are a clustering of every N items of the received corpus into a training unit, wherein N is an empirically derived value based, at least in part, on the size of the received corpus, and the training units are separated by gaps;
      calculate the similarity within a sequence of training units on either side of each of the gaps;
      select segment boundaries that improve intra-segment similarity and inter-segment disparity;
      calculate a perplexity value for each segment;

refine the seed model with one or more segments of the received corpus based, at least in part, on the calculated perplexity values;

iteratively refine the tuning set with segments ranked by the seed model and in turn iteratively update the seed model via the refined tuning set;

filter the received corpus via the seed model to find low-perplexity segments;

train the language model via the low-perplexity segments;

generate the language model that is representative of the textual corpus for use by a host of applications; and provide recognition of the textual corpus based on the language model.

18. A modeling agent according to claim 17, wherein the tuning set is dynamically selected as relevant to the received corpus.

19. A modeling agent according to claim 17, the data structure generator comprising:

a dynamic lexicon generation function, to develop an initial lexicon from the tuning set, and to update the lexicon with select segments from the received corpus.

20. A modeling agent according to claim 17, the data structure generator comprising:

a frequency analysis function, to determine a frequency of occurrence of segments within the received corpus.

21. A modeling agent according to claim 17, the data structure generator comprising:

a dynamic segmentation function, to iteratively segment the received corpus to improve a predictive performance attribute of the modeling agent.

22. A modeling agent according to claim 21, wherein the dynamic segmentation function iteratively re-segments the received corpus until the language model reaches an acceptable threshold.

23. A modeling agent according to claim 21, the data structure generator further comprising:

a frequency analysis function, to determine a frequency of occurrence of segments within the received corpus.

24. A modeling agent according to claim 23, wherein the data structure generator selectively removes segments from the data structure that do not meet a minimum frequency threshold, and dynamically re-segments the received corpus to improve predictive capability while reducing the size of the data structure.

25. A modeling agent according to claim 17, wherein the data structure generator selectively prunes the Dynamic Order Markov Model data structure.

26. A method of jointly optimizing the performance and size of a language model, comprising:

providing a textual corpus comprising subsets wherein each subset comprises a plurality of items;

creating a Dynamic Order Markov Model data structure by assigning each item of the plurality of items to a node in the data structure, wherein the nodes are logically coupled to denote dependencies of the items, and calculating a frequency of occurrence for each item of the plurality of subsets;

segmenting one or more relatively large language corpora into multiple segments of N items, wherein N is an empirically derived value based, at least in part, on the size of the received corpus;

selecting an initial tuning sample of application-specific data, the initial tuning sample being relatively small in comparison to the one or more relatively large language corpora, wherein the initial tuning sample is used for training a seed model, the seed model to be used for ranking the multiple segments from the language corpora;

iteratively training the seed model to obtain a mature seed model, wherein the iterative training proceeds until a threshold is reached, each iteration of the training including:

updating the seed model according to the tuning sample;

ranking each of the multiple segments according to a perplexity comparison with the seed model;

selecting some of the multiple segments that possess a low perplexity; and augmenting the tuning sample with the selected segments;

once the threshold is reached, filtering the language corpora according to the mature seed model to select low-perplexity segments;

combining data from the low-perplexity segments;

training the language model according to the combined data; and generating the language model that is representative of the textual corpus for use by a host of applications; and providing recognition of the textual corpus based on the language model.

27. The method as recited in claim 26, wherein the selecting an initial tuning sample comprises selecting a few application-specific documents.

28. The method as recited in claim 26, wherein the threshold comprises one of a predetermined size of the seed model or a sufficient application specificity of the seed model.

29. The method as recited in claim 26, further comprising pruning the language model utilizing an entropy based cutoff algorithm that uses only information embedded in the language model itself.

30. A storage medium comprising a plurality of executable instructions including at least a subset of which, when executed, implement a method according to claim 29.

31. The method as recited in claim 26, further comprising pruning the Dynamic Order Markov Model data structure.

32. A storage medium comprising a plurality of executable instructions including at least a subset of which, when executed, implement a method according to claim 26.

* * * * *